United States Patent [19]
Joko et al.

[11] Patent Number: 6,065,256
[45] Date of Patent: May 23, 2000

[54] SOLAR CELL ROOFING STRUCTURE AND THE SOLAR CELL PANELS USED THEREIN

[75] Inventors: Takashi Joko; Satoshi Joko, both of Tokyo, Japan

[73] Assignees: Joko Manufacturing Co., Ltd.; Satoshi Joko, both of Tokyo, Japan

[21] Appl. No.: 09/241,375

[22] Filed: Feb. 2, 1999

[30] Foreign Application Priority Data

Nov. 10, 1998 [JP] Japan .................................. 10-318545

[51] Int. Cl.⁷ .................................................. E04D 13/18
[52] U.S. Cl. ............................................ 52/173.3; 52/537
[58] Field of Search .................................. 52/173.3, 537; 136/244

[56] References Cited

U.S. PATENT DOCUMENTS

| | | | |
|---|---|---|---|
| 3,667,185 | 6/1972 | Maurer | 52/537 |
| 4,063,544 | 12/1977 | Bowen | 126/270 |
| 4,123,883 | 11/1978 | Barber, Jr. et al. | 52/200 |
| 4,178,909 | 12/1979 | Goolsby et al. | 126/417 |
| 5,092,939 | 3/1992 | Nath et al. | 52/173.3 |
| 5,409,549 | 4/1995 | Mori | 52/173.3 |
| 5,787,653 | 8/1998 | Sakai et al. | 52/173.3 |

FOREIGN PATENT DOCUMENTS 8-284350  10/1996  Japan .

*Primary Examiner*—Carl D. Friedman
*Assistant Examiner*—Dennis L. Dorsey
*Attorney, Agent, or Firm*—Oliff & Berridge, PLC

[57] ABSTRACT

Title of the invention is Solar Cell Roofing Structure And The Solar Cell Panels Used Therein. As a roofing material, the solar cell panels are supported on a fireproof, non-inflammable material in such a way as to secure cooling air flow channels under the panels. Such a technology is aimed at guaranteeing durable and effective weathering and achieving cost reduction.

These aims can be accomplished by the following means: The solar cell panel (19) which comprises a solar cell (1) disposed under tempered glass plate (8), an extension for lap roofing at the lower edge of said panel, and a metal sheet (20) integrated with said panel and having the bottom extended from the upper edge of said panel for the overlapping with the metal sheet of the upper panel, wherein said metal sheet is folded to give a projection (20a) for support at the center of panel width and to give embankments (20b) for support and hold on both the longitudinal sides of said panel.

With this panel as a roofing module, the panels (19) are laid on the roof adjacently to one another in the slope direction as well as in the direction perpendicular to the slope. In laying the panels on the roof, the upper panel is laid so that its extension will settle on the upper edge of the lower panel, and in turn the metal sheet (20) of the upper panel is overlapped with the extended metal sheet bottom of the lower panel. The two embankments (20b) sitting face to face on the same rafter (27) are covered with a groove-like bending member (28) in the shape of a glass presser foot, and are fixed by the bead (30), wherein said bead (30) is also overlapped with upper bead (30) in the lap-roofed area where the upper panel (19) settles on the upper edge of the lower panel (19).

FIG. 11 is designated for the understanding of this invention.

3 Claims, 12 Drawing Sheets

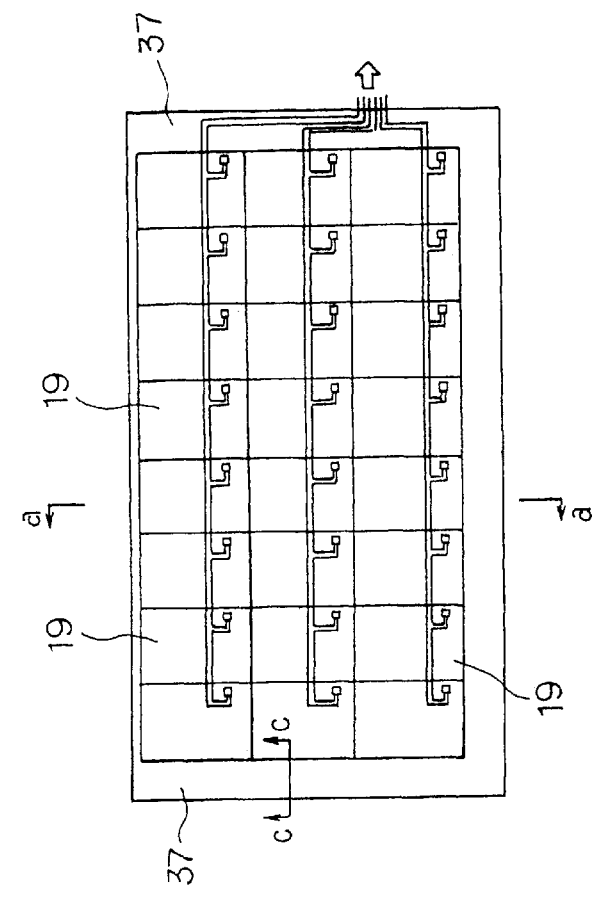
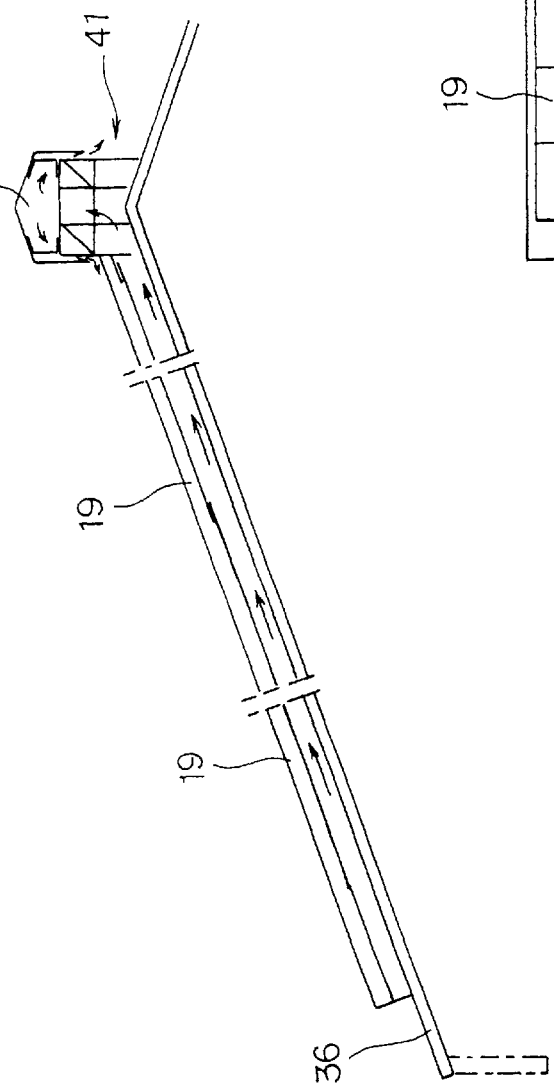
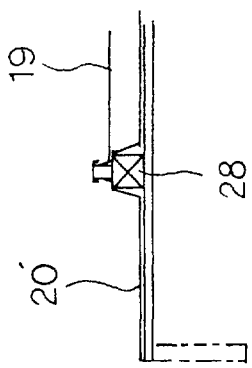
FIG. 7

FIG. 8
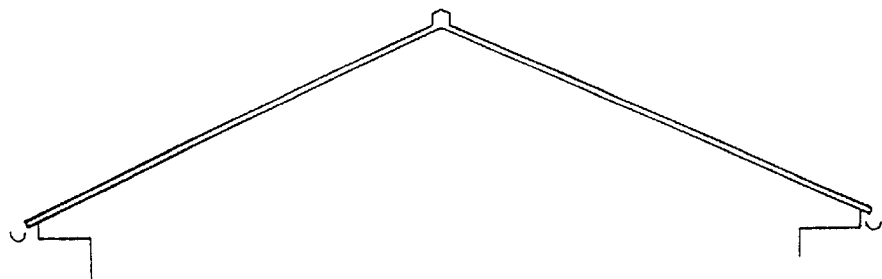
a.
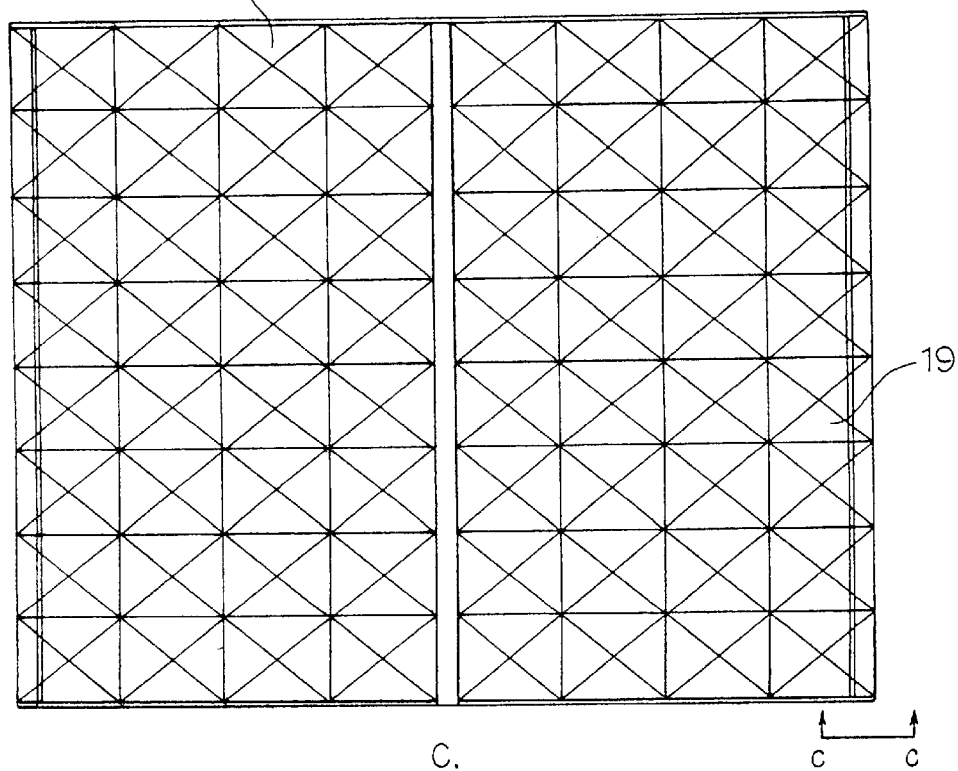
b.
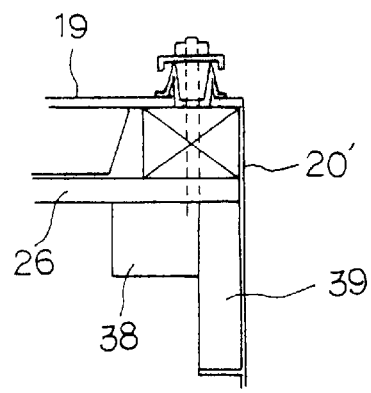
c.

SOLAR CELL ROOFING STRUCTURE AND THE SOLAR CELL PANELS USED THEREIN

TECHNICAL FIELD

This invention relates to a solar cell roofing structure and the solar cell panels used therein.

BACKGROUND OF THE INVENTION

Recently, house owners have been encouraged to install a solar cell system on the roof of their house to make effective use of solar energy without any adverse effect on the environment and ecosystem, and thereby to be self-sufficient in electricity consumed in their house.

For the purpose of this kind, use is made of solar cell panels of a waterproof structure wherein the solar cells are placed inside the panel, so as to prevent accidents caused by water, such as electric leakage or short-cut. These solar cell panels are standardized in such a size that a panel would give a certain voltage or power and would have a given number of solar cells arrayed inside the panel. The surfaces of solar cells are covered by a solar cell glass plate, which is a component of the solar cell panel, and are sealed with an adhesive material such as ethylene vinyl acetate (EVA).

These solar cell panels are laid on the roof by means of support members, with space maintained between the panels and the roof. This space is open to the outside so that air in the space can be replaced with outside air. Thus, the solar cell panels are cooled by the air flow through this space, and are prevented from decreased efficiency of power generation.

In these solar cell panels, there is a possibility that EVA may catch fire as it is heated from the eaves side or through the roof bed.

Recently, published Japanese Patent Application No. 8-284350 made a rational proposal on the materials and operation for bringing to completion a solar cell roofing structure in which the aforementioned solar cell panels themselves are used as the roofing material (i.e., as the roof tiles).

As shown in FIGS. 11 and 12, the roofing bed 3 of the house B mainly comprises a roofing material 7 laid over the entire surface of roof board 6 which is supported on rafters 5. A plurality of solar cell panels A are installed on this roofing bed 3.

The solar cells 1 are disposed under transparent tempered glass plate 8 to prevent the solar cell panels A from being broken when roofers walk on the panels. Metal sheets 2 are placed under the solar cells 1 in such a manner as to leave the bottom of the solar cells 1 untouched by the metal sheets 2. Aluminum beads 9 having a U-shaped cross-section are fitted to all the edges of the tempered glass plate 8. The aluminum bead 9, the solar cell 1, and the metal sheet 2 are adhered to one another and integrated by an adhesive 10. Each solar cell panel A is a rectangle in the plan view. Along the longitudinal side of the metal sheet 2, which is a component of the solar cell panel A, there is provided a connecting part 11 having a U-shaped cross-section. The connecting part 11 is disposed so that it is extended outward from the position of U-shaped aluminum bead 9. Wire connectors 4 are disposed on both ends of the metal sheet 2 along the lateral side. One of the wire connectors 4 is extended outward from the side edge of the metal sheet 2. The other wire connector 4 on the metal sheet 2 of the solar cell panel A is disposed so that the connector 4 is in a position inward from the side edge of the metal sheet 2. In this way, the wire connector from the upper panel and the wire connector from the lower panel are disposed in the positions connectable with each other, when a solar cell panel A on the upper side is butt-jointed with a solar cell panel A on the lower side.

FIG. 11 shows the wiring extending from a solar cell 1. The wire 12 is led through the metal sheet 2 to its downside and is connected with the wire connector 4, which is disposed at the end of the metal sheet 2.

The space between the solar cells 1 and the metal sheet 2 constitutes an air flow channel 13 for cooling the solar cell panels. The aluminum bead 9 fitted along the lower edge of each solar cell panel A has a covering portion 9a extended from the upper surface of the bead 9. The aluminum bead 9 fitted along the upper edge of each solar cell panel A has a receiving portion 9b extended from the lower surface of the bead 9. When an upper panel and a lower panel are laid adjacently to each other in the direction of roof slope, the covering portion 9a of the lower bead 9 fitted to the upper panel is engaged with the receiving portion 9b of the upper bead 9 fitted to the lower panel, with a coking material 14 being filled in between, so that the water-tightness is secured in the connected area.

When panels are laid side by side in a direction perpendicular to the roof slope, the panels A are disposed in such a way that a rafter 5 always comes under each connecting portion 11 of the metal sheet 2 provided along the longitudinal side of the panel A. Thus, one connecting portion 11 of a panel sits on a rafter 5 side by side with the other connecting portion 11 of the next panel. The two adjacent connecting portions 11 are covered with a metal fitting 15 having a reverse U-shaped cross-section. This metal fitting 15 is fixed to the rafter 5 via roof bed 3 by using a fixture 16, so that the panels can be connected to one another. The part 17 is an inner cap having a reverse U-shaped cross-section, disposed inside the metal fitting 15 and used to cover directly the two connecting portions 11. On the metal fitting 15 is fitted a cap 18, which fills the gap between the two aluminum beads 9 of solar cell panels A disposed side by side in a direction perpendicular to the roof slope.

The above-described solar cell panel A is provided with a non-inflammable material, such as the metal sheet 2, under the solar cells 1, with a space left between the solar cells 1 and the metal sheet 2. Due to this non-inflammable material, the solar cell panels are protected against fire coming from the eaves side or from the roof bed. The space between the solar cell 1 and the non-inflammable material (i.e., the metal sheet 2) can also be utilized as a vent for the gas evolving from the filler in the solar cells 1 at the time of production and/or operation of solar cells 1. Because the non-inflammable material is integrated in the solar cell panel, the solar cell roof of a fireproof, non-inflammable structure can easily be formed, which is protected against fire coming from the eaves side or through the roof bed, by setting up the solar cell panels A, one after another on the roof.

As described above, the prior-art solar cell panels can be certainly utilized as a roofing material by supporting the panels on a fireproof, non-inflammable material in such a way as to secure a cooling air flow channel. However, for the weathering at the joints between panels laid in the roof slope direction, the gap is filled with a coking material. It is commonly known that of all the areas of a house, the roof is a place most severely affected by the wind, the rain, and the sunlight. In existing tile roofs, the most important weathering is secured by laying roof tiles in an overlapping manner. It is not technically reasonable to think that the weathering can be guaranteed by coking, without overlapping the roofing material.

The solar cell panels are manufactured by protecting the panel edges with the aluminum bead 9, are integrated with the non-inflammable supporting material by adhering the supporting material to the bordering areas on the lower surface of the panel, and are brought in to the site in packages. In such assemblies, it is not necessary to protect the panel edges with the aluminum bead 9 which is usually used on the premises that the panel is dealt with as a single material. (The two beads 9 serve to receive the cap 18.) Such a panel assembly incurs a higher cost of production than a necessary level.

Furthermore, the cap 18 serves as a means of weathering between the two adjacent roofing materials in the direction of the roof slope. This weathering merely involves pushing the cap 18 into the gap between the two aluminum beads 9. In this case, it is assumed that rainwater is allowed to creep into the grooves formed by the connecting portions 11. In a structure allowing water to get inside the gap, a serious situation may be brought if the drainpipe is clogged.

SUMMARY OF THE INVENTION

The object of this invention is to provide a novel solar cell roofing structure and a roofing material based on this structure, wherein the basic waterproofness is most reliably achieved by overlapping the roofing material. The solar cell panel is integrated by assembling the panel with a non-inflammable material. A large cost reduction has been realized practically by making this non-inflammable material directly play the role of edge protection (that is, by omitting the bead). In addition, as regards the weathering for the joints of adjacent roofing panels laid in the direction parallel to the ridge, the above-described roofing structure has an embankment formed on each longitudinal side of a roofing panel, so that rainwater will never go into the void between panels.

The aforementioned object can be achieved by the solar cell roofing structure of this invention, wherein the solar cell panel comprises a solar cell disposed under tempered glass plate, an extension for lap roofing at the lower edge of said panel, and a metal sheet integrated with said panel and having the bottom extended from the upper edge of said panel for the overlapping with the metal sheet of the upper panel, wherein said metal sheet is folded to give a projection for support at the center of panel width and to give embankments for support and hold on both the longitudinal sides of said panel.

As roofing modules the panels are laid on the roof adjacently to one another in the slope direction as well as in the direction perpendicular to the slope. In laying the panels on the roof board, the upper panel is laid so that its extension will settle on the upper edge of the lower panel, and in turn the metal sheet of the upper panel is overlapped with the extended metal sheet bottom of the lower panel. The two embankments sitting face to face on the same rafter are covered by a groove-like bending member in the shape of a glass presser foot, and are fixed by the bead, wherein said bead is also overlapped with upper bead in the lap-roofed area where the upper panel settles on the upper edge of the lower panel.

The weathering of these roofing panels is perfect because both of the panels and the metal sheet bottom are overlapped along the slope. The two neighboring embankments, which are effective to protect the panels against rainwater, are covered with the groove-like bending member and the bead. A combination of this embankment protection and the lap roofing instead of butt roofing makes weathering perfect.

Since the aforementioned weathering is based on an overlapping structure, there is no risk of deterioration with the lapse of time and the water invasion into the panel assemblies. The panels are integrated with the folded metal sheet in such a way that the panel is held on both sides by the embankments. Therefore, the metal sheet serves also as the reinforcements for the panel sides. This arrangement is rational and advantageous from a cost point of view.

BRIEF DESCRIPTION OF THE DRAWINGS

FIG. 2-*b* is an enlarged view of the circled section in FIG. 2-*a*.

FIG. 7-*a* is an explanatory drawing of panel roofing according to this invention taken from arrows a—a of FIG. 7-*b*;

FIG. 7-*b*, a plan vie of a roof; and

FIG. 7-*c*, an area near the eaves taken from arrows c—c of FIG. 7-*b*.

FIG. 8-*a* is a cross-sectional front view of a roof;

FIG. 8-*b*, a plan view of panel roofing; and

FIG. 8-*c*, an area near eaves taken from arrows c—c in FIG. 8-*b*.

DETAILED DESCRIPTION OF THE INVENTION

This invention is further described by referring to the preferred embodiments shown in FIGS. 1 to 10.

Figure 1:
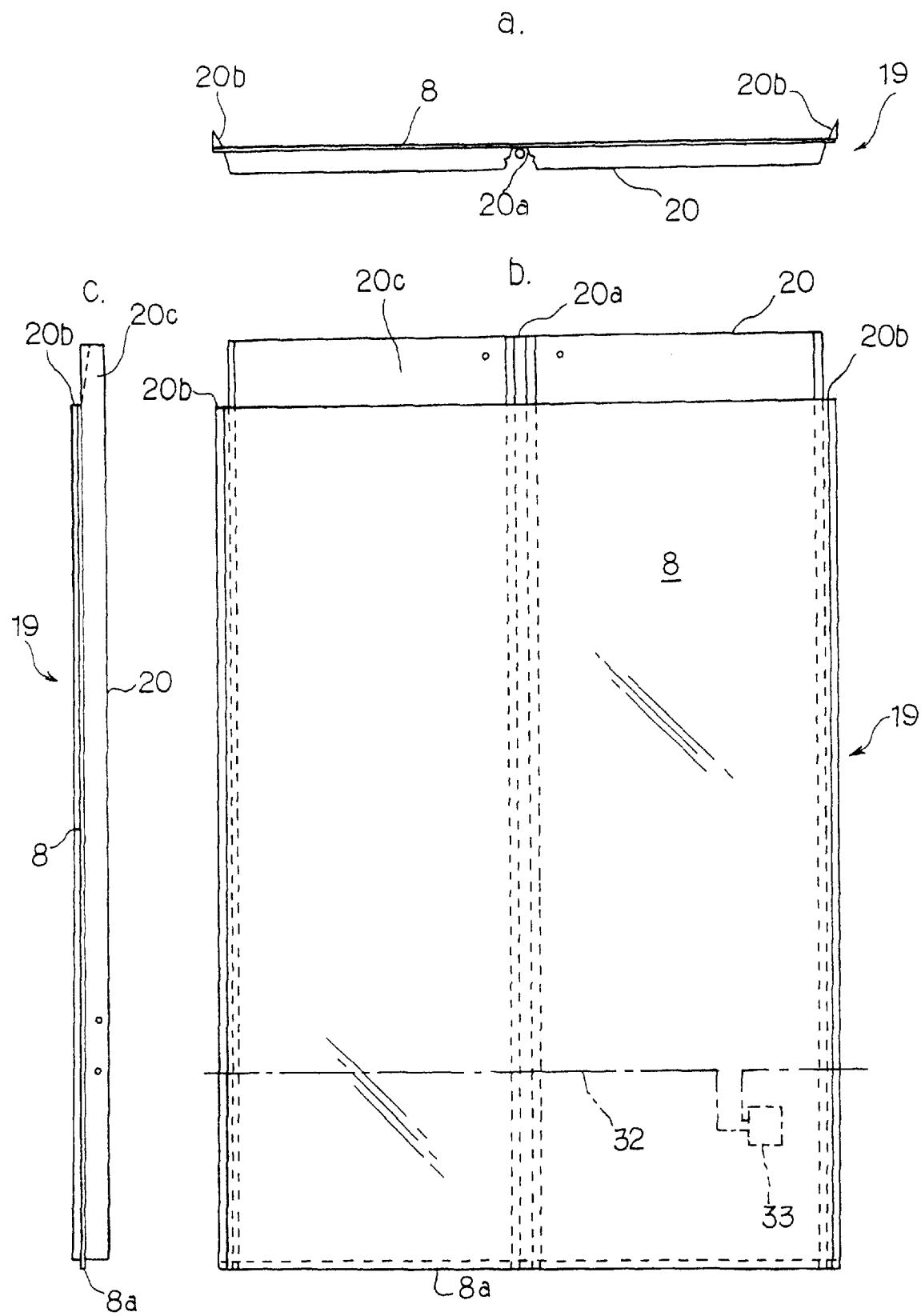
FIGS. 1-*a*, -*b*, and -*c* are the front view, plan view, and side view of the panel of this invention.
Figure 2:
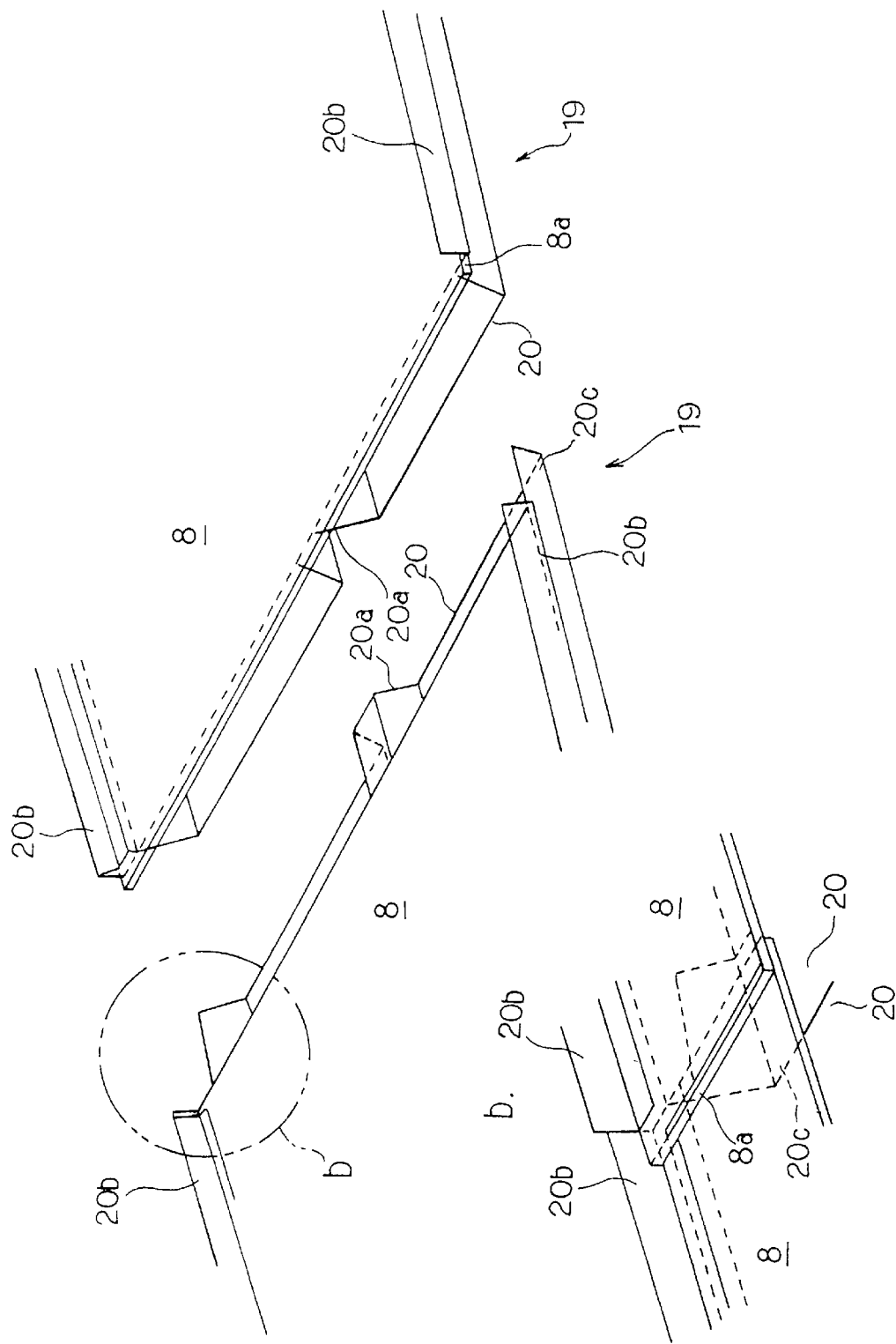
FIG. 2-*a* is a perspective view of the two panels according to this invention in the overlapping area.
Figure 3:
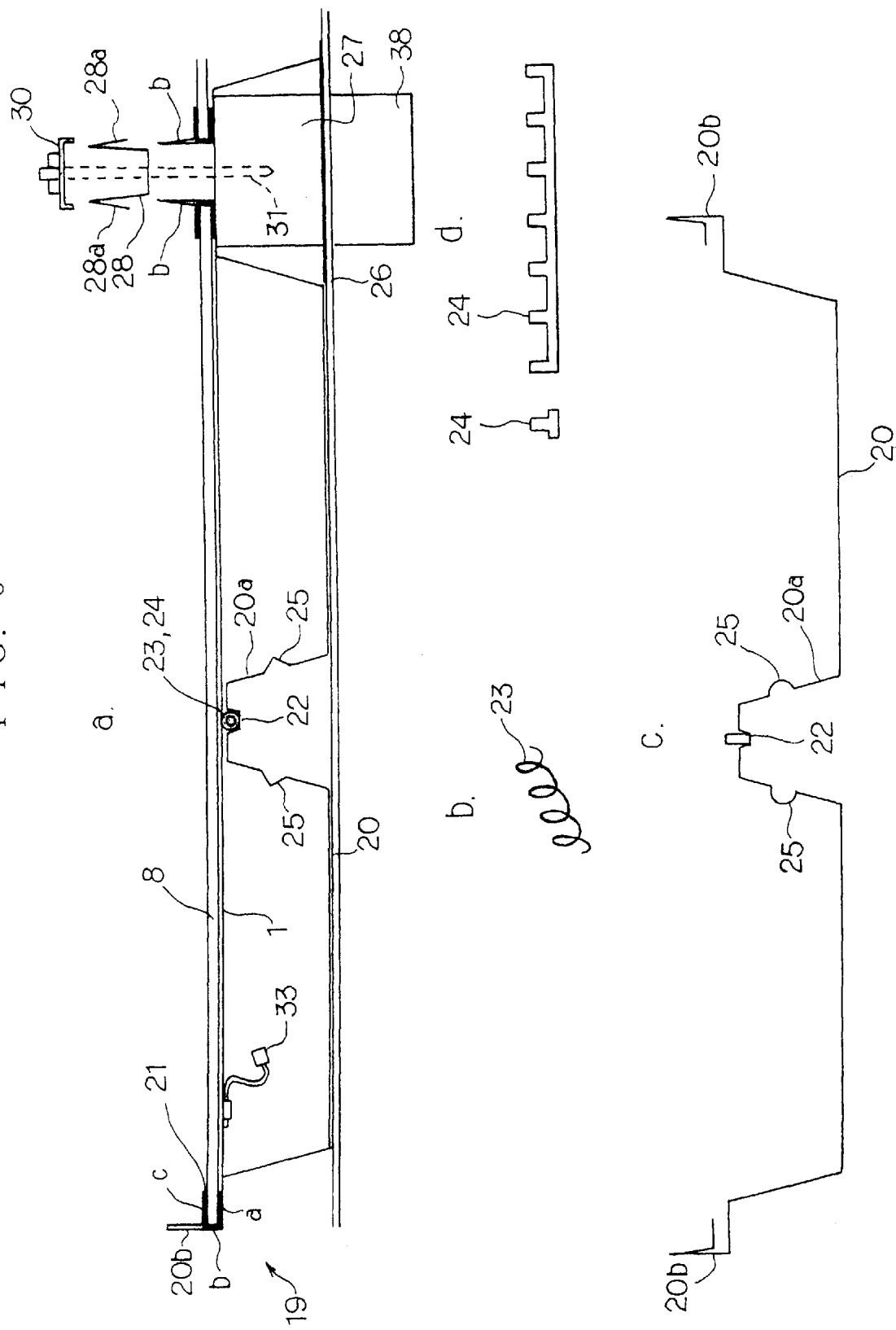
FIGS. 3-*a*, to 3-*d* are an entire side view of the panel according to this invention, an explanatory drawing of a part, an explanatory drawing of a metal component, and an explanatory drawing of a part.

FIGS. 1–3 show the solar cell panel 19 of this invention. The solar cell panel 19 has the solar cell 1 disposed under the tempered glass plate 8 and is integrated with the metal sheet 20, which has been folded to give a rafter-like projection 20*a* for support at the center of panel width and the embankments 20*b* for support and hold on both sides of the panel 19.

The panels 19 are laid on the roof in positions adjacent to one another in the direction of roof slope and in the direction perpendicular to the slope. At that time, the panels are lap-jointed in the slope direction, and are butt-jointed in the lateral direction. On the upper edge, the panel has an extended metal sheet bottom 20c which is obtained by cutting off the embankments on both sides in a necessary length so that the extended bottom 20c can be overlapped with the metal sheet 20 of the upper panel. On the lower edge, the panel has an extension 8a from the tempered glass plate 8 in a length sufficient for lap roofing.

The above-described embankments 20b for support and hold are formed by erecting the embanking portion (b) from the supporting portion (a) and then folding the sheet edge into the holding portion (c). The embankments 20b are integrated with the tempered glass plate 8 by filling the holding portion (c) with an adhesive 21, such as double-adhesive tape.

Unlike the groove-like structure between the prior-art panels, the panel 19 of this invention is thus made completely waterproof with no water leak from both sides as the panel is protected by the embankments on both sides.

As shown in FIG. 3, the rafter-like projection 20a at the center has a flat-bottomed groove 22 on its top surface. This groove receives a rubber coil 23 or a rubber member 24 provided with protrusions disposed at a certain interval, which serves as an insulator. When the metal sheet 20 comes in contact indirectly with the solar cell 1 through the insulator, heat is prevented from being transmitted from the solar cells to the metal sheet 20. As a result, power generation function need not be decreased. The projection 20a at the center is provided to prevent the tempered glass plate 8 from being damaged when roofers may walk on the panels. Along with the rafters on both sides of the panel, the projection 20a bears the burden softly in the 3-point support. For additional flexibility it is further preferred that the projection 20a has a flexible rib 25 on each wall.

Figure 4:
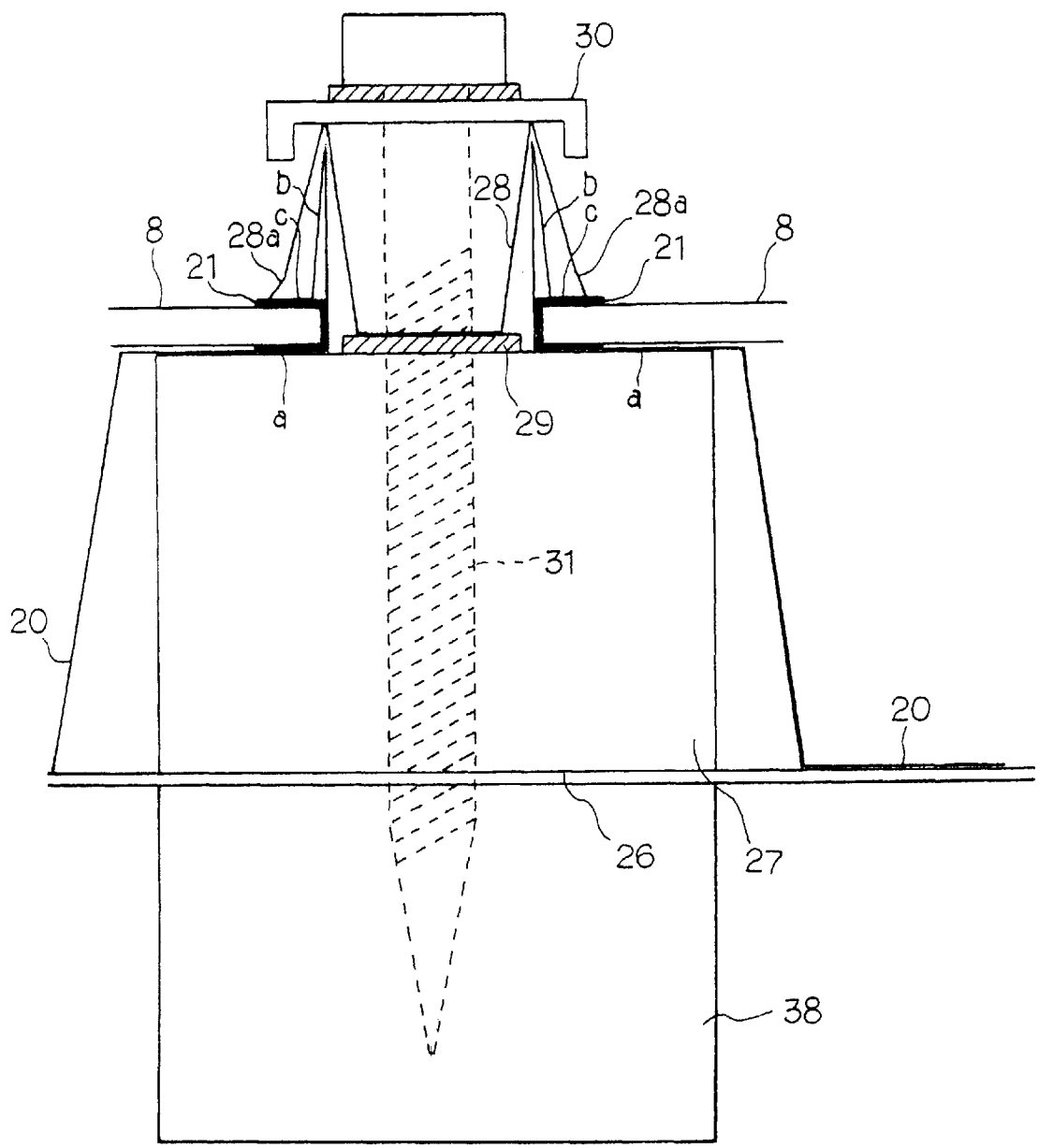
FIG. 4 is an explanatory drawing which shows the setting of the panels according to this invention, settled on a rafter.

The panels 19 are laid on the roof in an overlapping manner. As shown in FIG. 4, the two panel sides, each from an adjacent panel 19, are put on a rafter 27 sitting on the roof board 26. For the weathering in this area, a groove-like bending member 28 provided with a saddle 28a is used to cover the embankments (b) on both sides. At that time, this member 28 rides across the embankments, with the saddle 28a at each edge pressing down the respective panel. The flat bottom of this member 28 rests on packing 29, and the bead 30 sits across the embankments (b) to cover the groove. The bead 30 and the bending member 28 are fixed with a wood screw 31 which penetrates the rafter 27 and goes down into the lower rafter 38 under the roof board 26.

Owing to the embankments (b) and the bending member 28, the butt joint between panels is completely protected against rainwater coming from the panel surface. Panels are thus laid on the roof satisfactorily, with perfect weathering being secured at the panel joints in the slope direction as well as in the direction perpendicular to the slope.

FIGS. 1 and 3 show current-collecting wire 32 and wire connector 33 for the solar cell panel. Because this wire is made to pass in the lateral direction, preferably it runs along the line 20 cm distant from the lower edge of the panel 19, and about 15 cm above the metal sheet bottom. The wire requires to pass through holes in the wall portions of the metal sheet 20 (i.e., holes in the rafter-like projection 20a for support and the embankments 20b for support and hold).

The metal sheet to be used has a width of 1 m, as specified under the steel plate standard. Since it is quite easy in the forgoing system to dispose the panel/metal sheet assemblies between rafters 27 and 27, cost reduction can be expected in panel production and roofing work. From a durability point of view it is further advantageous to utilize color stainless steel sheets and to make the metal sheet life consistent with the long redemption period for the solar cell panels.

Figure 5:
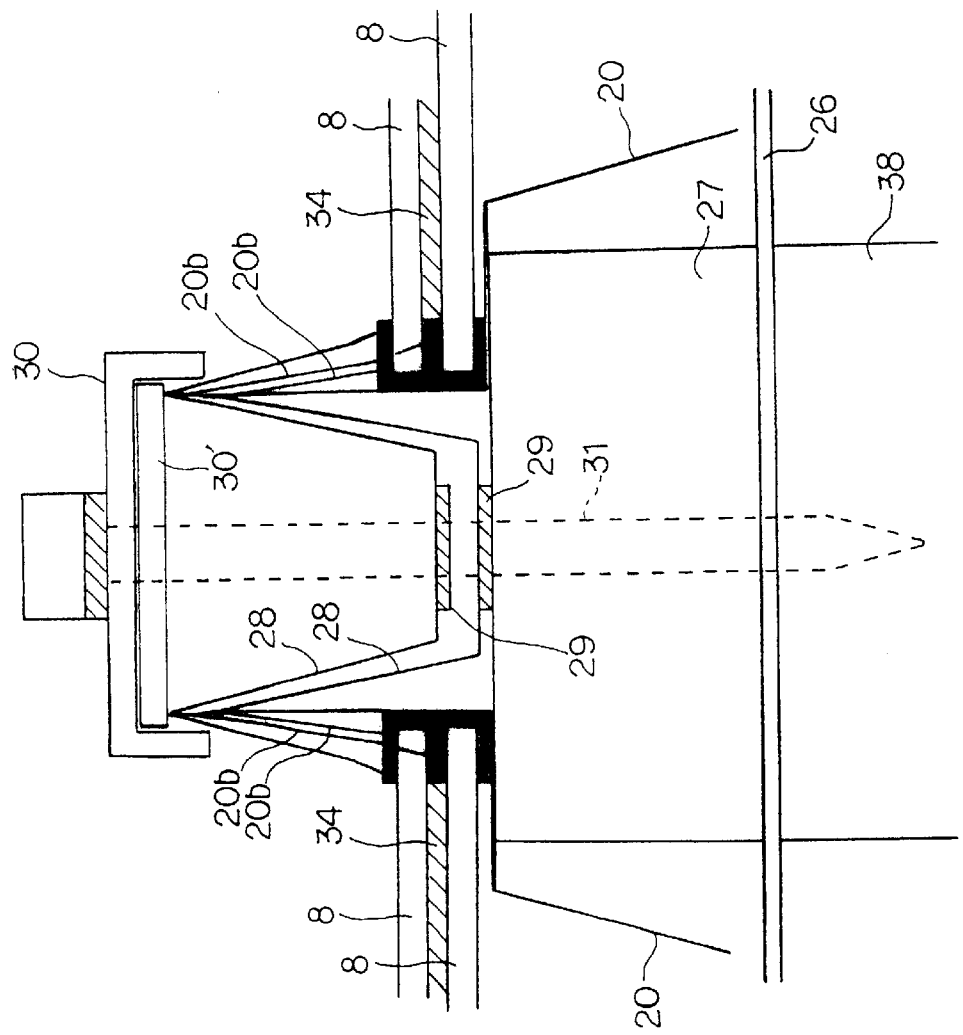
FIG. 5 is an explanatory drawing which shows the setting, on a rafter, of the overlapping area of the panels according to this invention.
Figure 6:
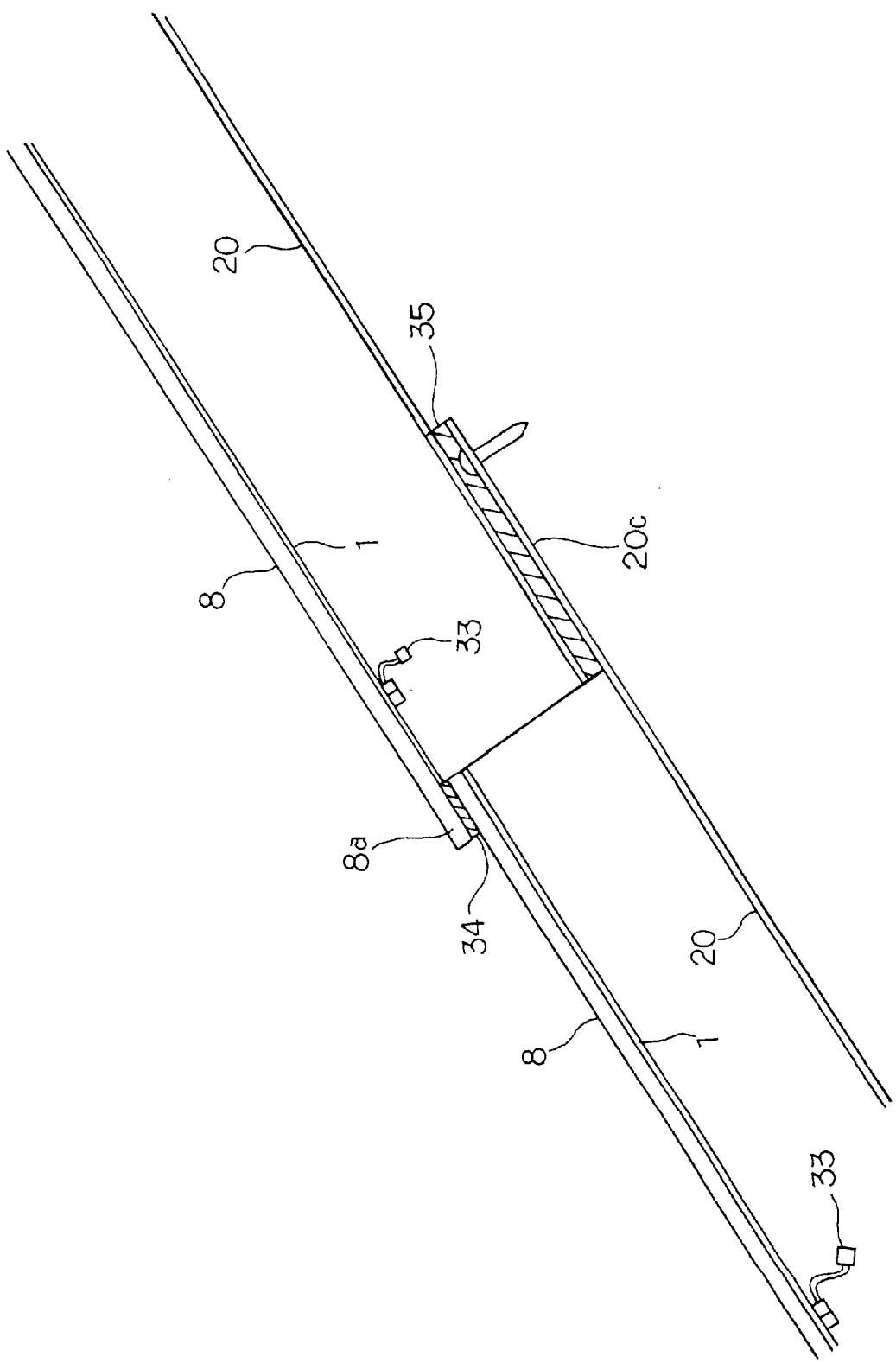
FIG. 6 is an explanatory drawing which shows the setting of the panels in the overlapping area.

FIGS. 5 and 6 show the details of an overlapped area between a panel 19 and another panel 19.

As shown, double adhesive tape is attached to seal the overlapped area between the two tempered glass plates 8. It is also preferred to use packing 35 between the metal sheet 20 and the extended metal sheet bottom 20c to seal the downside overlapped area (FIG. 6).

When the embankments 20b and 20b in the overlapped area are butt-jointed on a rafter 27, the groove-like bending member 28 for the upper panel hangs over the corresponding member 28 for the lower panel. The bead 30 on the higher level is slightly extended and sits on the bead 30' on the lower level. In order to accept the bead 30 from above, the bead 30' has both sides cut. On both sides of the bending members, the saddles 28a too are overlapped.

FIGS. 7 and 8 show examples of roofing work according to this invention. In FIG. 7, there remain unroofed areas on both verges 37 and on the eaves side 36, which also serve as catwalks. The unroofed areas are preferably covered with steel plates 20' which can be fixed to the rafters 27.

FIG. 8 shows a case where the panels are laid over the entire roof. The eaves side is settled in such a way that verge-board 39 is fixed to the rafter 38 under the roof board 26, and is covered with a steel plate 20'.

According to this invention, it is taken for granted that ridge piece 40 is provided with ventilating openings which are connected with the air flow channels disposed under the panels 19 (FIG. 7-a).

Figure 9:
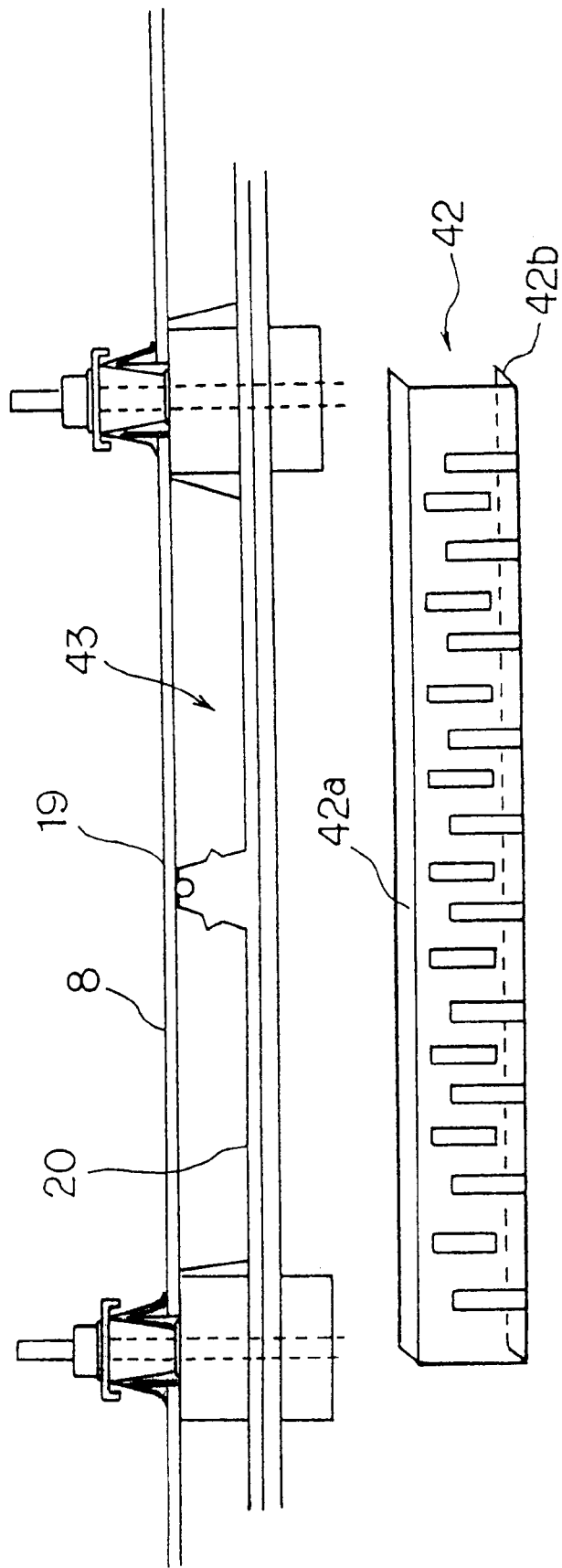
FIG. 9 shows the setting of the lower header of the lowest panel according this invention.

FIG. 9 shows a slitted cover 42 which is attached to the lower header 43 of the lowest panel 19 so as to keep small animals from entering the inside of panels. The cover 42 can be fitted to the roof end by inserting the upper and lower bendings 42a and 42b into the underside of tempered glass plate 8 and the underside of the metal sheet 20, respectively.

Figure 10:
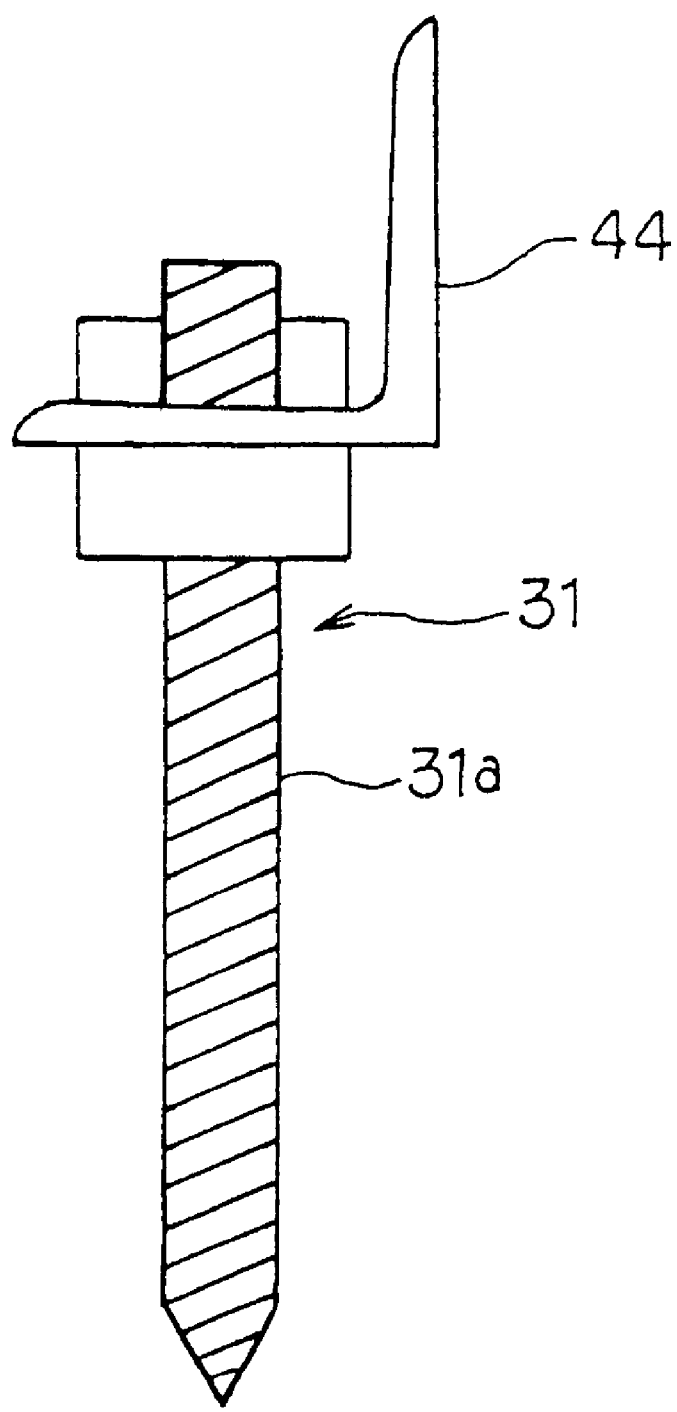
FIG. 10 is explanatory drawing of a snow guard fixture to be fitted on roof according to this invention.
Figure 11:
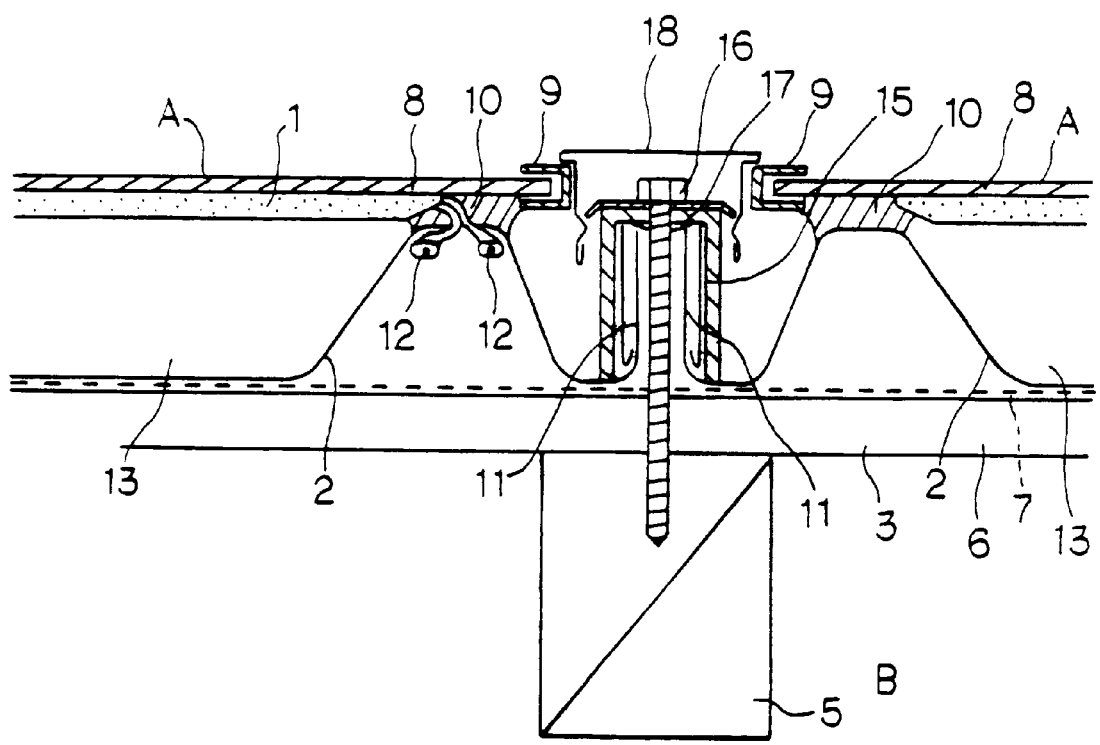
FIG. 11 is a longitudinal cross-section in the connecting area of prior-art panels.
Figure 12:
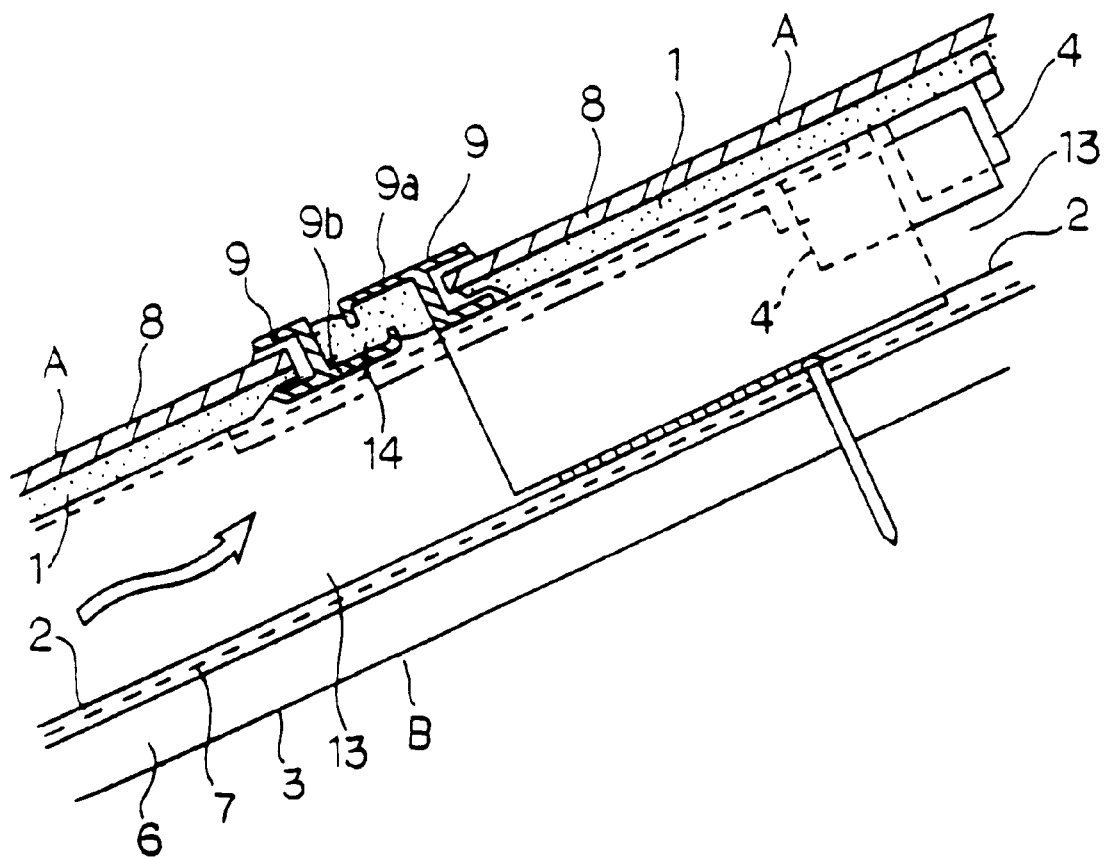
FIG. 12 is an explanatory drawing which shows the connecting area of prior-art panels in the direction of roof slope.

FIG. 10 shows a snow guard fixture 44, which is fitted to the wood screw 31. In this case, the screw used for the panel at the lowest position has a longer threaded portion than usual, and the snow guard fixture 44 is fitted to the upper portion 31a of the screw.

The solar cell roofing structure of this invention has been described in details. Its effectiveness is summarized as follows:

The panels as a roofing material are supported on a fireproof, non-inflammable material in such a way as to secure cooling air flow channels under the panels. Such panels guarantee durable, highly reliable weathering. In addition, cost reduction can be expected in the cost of panels themselves and in the total cost of roofing work. From these points it is highly desirable for this roofing system to find its wide use in the future.

What is claimed is:

1. A solar cell panel joining structure, each solar cell panel having a solar cell under a tempered glass plate, a metal sheet integrated with the solar cell such that the metal sheet forms an air channel and a bottom side underneath the solar cell, the solar cell panel joining structure comprising:

a plurality of solar cell panels with top sides, bottom sides, lower edges, and upper edges;

the top side of the solar cell panel being significantly thicker than the bottom side of the solar cell panel;

the lower edges of the solar cell panels having lower edge extensions on the top side;

the upper edges of the solar cell panels having upper edge extensions on the bottom side;

a packing material placed on top of the upper edge extensions;

wherein an upper solar cell panel is placed higher on a slope than a lower solar cell panel such that the lower edge extension on the upper solar panel overlaps the top side of the lower solar cell panel and the bottom side on the upper solar cell panel overlaps the upper edge extension of the lower solar cell panel such that the top overlap is waterproof, and the bottom overlap is sealed because of the packing material.

2. The solar cell panel joining structure of claim 1, further comprising at least one flexible rib on one or more of the extensions.

3. A method of joining solar cell panels, each solar cell panel having a solar cell under a tempered glass plate, a metal sheet integrated with the solar cell such that the metal sheet forms an air channel and a bottom side underneath the solar cell, the method of solar cell panel joining comprising:

making a plurality of solar cell panels with top sides, bottom sides, lower edges, and upper edges;

making the top side of the solar cell panel significantly thicker than the bottom side of the solar cell panel;

making the lower edges of the solar cell panels have lower edge extensions on the top side;

making the upper edges of the solar cell panels have upper edge extensions on the bottom side;

placing a packing material on top of the upper edge extensions;

placing an upper solar cell panel higher on a slope than a lower solar cell panel such that the lower edge extension on the upper solar panel overlaps the top side of the lower solar cell panel and the bottom side on the upper solar cell panel overlaps the upper edge extension of the lower solar cell panel such that the top overlap is waterproof, and the bottom overlap is sealed because of the packing material.

\* \* \* \* \*

UNITED STATES PATENT AND TRADEMARK OFFICE
CERTIFICATE OF CORRECTION

PATENT NO. : 6,065,256
DATED : May 23, 2000
INVENTOR(S) : Takashi JOKO et al.

It is certified that error appears in the above-identified patent and that said Letters Patent is hereby corrected as shown below:

On the Title Page

Please replace the former Abstract with this new Abstract:

ABSTRACT

A solar cell panel joining structure, each solar cell panel having a solar cell under a tempered glass plate, a metal sheet integrated with the solar cell such that the metal sheet forms an air channel and a bottom side underneath the solar cell. The solar cell panel joining structure having a plurality of solar cell panels with top sides, bottom sides, lower edges, and upper edges. The top side of the solar cell panel is significantly thicker than the bottom side of the solar cell panel, the lower edges of the solar cell panels having lower edge extensions on the top side , the upper edges of the solar cell panels having upper edge extensions on the bottom side. A packing material is placed on top of the upper edge extensions. An upper solar cell panel is placed higher on a slope than a lower solar cell

UNITED STATES PATENT AND TRADEMARK OFFICE
CERTIFICATE OF CORRECTION

PATENT NO. : 6,065,256
DATED : May 23, 2000
INVENTOR(S) : Takashi JOKO et al.

It is certified that error appears in the above-identified patent and that said Letters Patent is hereby corrected as shown below:

panel such that the lower edge extension on the upper solar panel overlaps the top side of the lower solar cell panel and the bottom side on the upper solar cell panel overlaps the upper edge extension of the lower solar cell panel such that the top overlap is waterproof, and the bottom overlap is sealed because of the packing material.

Signed and Sealed this

Seventeenth Day of April, 2001

Attest:

NICHOLAS P. GODICI

Attesting Officer

Acting Director of the United States Patent and Trademark Office